US009929523B2

(12) United States Patent
Khazeni (10) Patent No.: US 9,929,523 B2
(45) Date of Patent: Mar. 27, 2018

(54) CONNECTOR FOR MECHANICALLY AND ELECTRICALLY CONNECTING A CHANDELIER TO A CEILING ELECTRIC BOX

(71) Applicant: Afshin Khazeni, Ile Bizard (CA)

(72) Inventor: Afshin Khazeni, Ile Bizard (CA)

( * ) Notice: Subject to any disclaimer, the term of this patent is extended or adjusted under 35 U.S.C. 154(b) by 17 days.

(21) Appl. No.: 15/168,343

(22) Filed: May 31, 2016

(65) Prior Publication Data
US 2016/0365691 A1    Dec. 15, 2016

(30) Foreign Application Priority Data
Jun. 10, 2015   (GB) .................................. 1510118.1

(51) Int. Cl.
| | | |
|---|---|---|
| H01R 33/00 | (2006.01) | |
| H02G 3/22 | (2006.01) | |
| H02G 3/20 | (2006.01) | |
| F21V 21/03 | (2006.01) | |

(52) U.S. Cl.
CPC ............. *H01R 33/00* (2013.01); *H02G 3/20* (2013.01); *H02G 3/22* (2013.01); *F21V 21/03* (2013.01)

(58) Field of Classification Search
CPC ...... H01R 33/00; H01R 13/639; H01R 12/82; H01R 13/193; H01R 12/7058; H02G 3/20; H02G 3/22; F21V 21/03
See application file for complete search history.

(56) References Cited

U.S. PATENT DOCUMENTS

| | | | |
|---|---|---|---|
| 484,911 A | 10/1892 | Green | |
| 1,412,748 A * | 4/1922 | McKay | ................... H02G 3/20 439/537 |
| 1,666,223 A | 10/1922 | Symmes | |
| 1,796,036 A | 3/1931 | Mangin | |
| 2,199,905 A | 5/1940 | Arras | |
| 2,968,784 A | 1/1961 | Mason | |
| 3,302,918 A | 2/1967 | Cohen | |
| 4,929,187 A * | 5/1990 | Hudson | ................... F21V 21/03 439/334 |
| 5,299,952 A | 4/1994 | Hinds, Jr. | |
| 6,146,191 A | 11/2000 | Kerr, Jr. et al. | |
| 6,322,232 B1 * | 11/2001 | Oliver | ...................... F21S 8/04 362/147 |
| 6,325,654 B1 * | 12/2001 | Kerr, Jr. | ............... F04D 25/088 439/313 |
| 6,464,524 B1 | 10/2002 | Kerr, Jr. et al. | |

(Continued)

FOREIGN PATENT DOCUMENTS

| | | |
|---|---|---|
| DE | 2330447 | 9/1975 |
| GB | 615692 | 1/1949 |

*Primary Examiner* — Michael C Zarroli (57) ABSTRACT

A connector for mechanically and electrically connecting a luminaire to a ceiling electric box comprises a first connector member and a second connector member wherein the first connector member is mechanically connected to the ceiling electric box using mechanical fasteners passing through openings, and the first connector member is electrically connected by way of line wires. A second connector member is used, along with a loop member, for mechanically and electrically connecting a luminaire. The loop member has a hollow bolt member to allow for electric wires coming from the luminaire to pass through and electrically connect to pins located inside the second connector member.

8 Claims, 8 Drawing Sheets

(56) References Cited

U.S. PATENT DOCUMENTS

| | | | |
|---|---|---|---|
| 6,780,049 B1* | 8/2004 | D'Angelo et al. | F04D 29/601 439/313 |
| 6,799,982 B2* | 10/2004 | Kerr, Jr. | F21V 21/02 439/140 |
| 6,997,740 B2* | 2/2006 | Kerr | F04D 25/088 439/318 |
| 7,064,269 B2 | 6/2006 | Smith | |
| 9,285,111 B2* | 3/2016 | Todd, Jr. | F21V 33/0096 |
| 9,394,919 B1* | 7/2016 | Byrne | F04D 29/646 |
| 2006/0000634 A1* | 1/2006 | Arakawa | F21S 8/06 174/128.1 |

* cited by examiner

CONNECTOR FOR MECHANICALLY AND ELECTRICALLY CONNECTING A CHANDELIER TO A CEILING ELECTRIC BOX

FIELD OF THE INVENTION

The present invention relates generally to to electrical devices but more particularly to a connector for mechanically and electrically connecting a chandelier or luminaire to a ceiling electric box.

BACKGROUND OF THE INVENTION

Some types of luminaries are big and heavy and that makes it a difficult process to install them onto a ceiling electrical box. It often requires two people, one to hold the luminaire and one to do the electrical and then the mechanical connections between the electrical box and the face plate of the luminaire. There has to be a better way for doing that.

SUMMARY OF THE INVENTION

In view of the foregoing disadvantages inherent in the known devices now present in the prior art, the present invention, which will be described subsequently in greater detail, is to provide objects and advantages which are:

To provide for an easy way for one person to install and remove a luminaire.

In order to do so, the invention comprises a first connector member and a second connector member wherein the first connector member is mechanically connected to the ceiling electric box using mechanical fasteners passing through openings, and the first connector member is electrically connected by way of line wires. A second connector member is used, along with a loop member, for mechanically and electrically connecting a luminaire. The loop member has a hollow bolt member to allow for electric wires coming from the luminaire to pass through and electrically connect to pins located inside the second connector member.

The second connector member is mechanically connected to the first connector member by being slid into the first connector member following a path formed by channels, forming an integral part of the first connector member and cooperating with guide tracks, forming an integral part of the second connector member. Sliding is done until the channels electrically connect a plurality of pins into a corresponding number of electrical connection clips; the plurality of clips electrically connect with the line wires.

Securing covers, located on each side of the guide tracks, clip and hold the second connector member securely onto the first connector member.

Push-in snap clips secure the securing covers in place.

The electrical connection clips being resiliently deformable so as to provide a secure electro-mechanical connection onto the pins.

Pins and clips being formed of metal selected from the group consisting of copper, aluminum and steel.

The first connector members and the second connector member being made from non-conductive material.

The first connector members and the second connector member are made by injection moulding and having reinforcement ribs.

A nut and washer combination mechanically connects the loop member to the second connector member.

The sliding motion being done parallel to a ceiling.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter which contains illustrated preferred embodiments of the invention.

DETAILED DESCRIPTION

Figure 1:
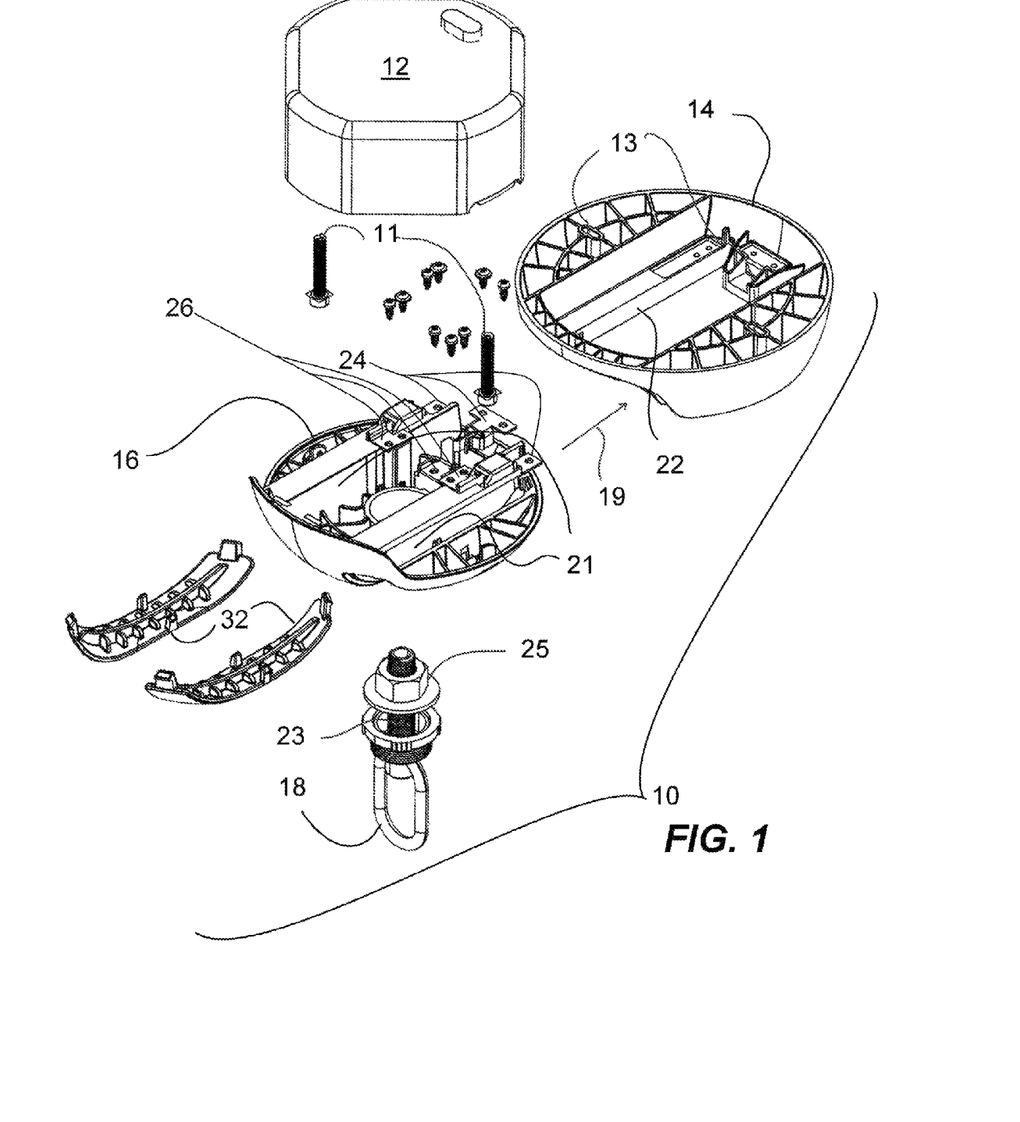
FIG. 1 Exploded view of the invention.
Figure 2:
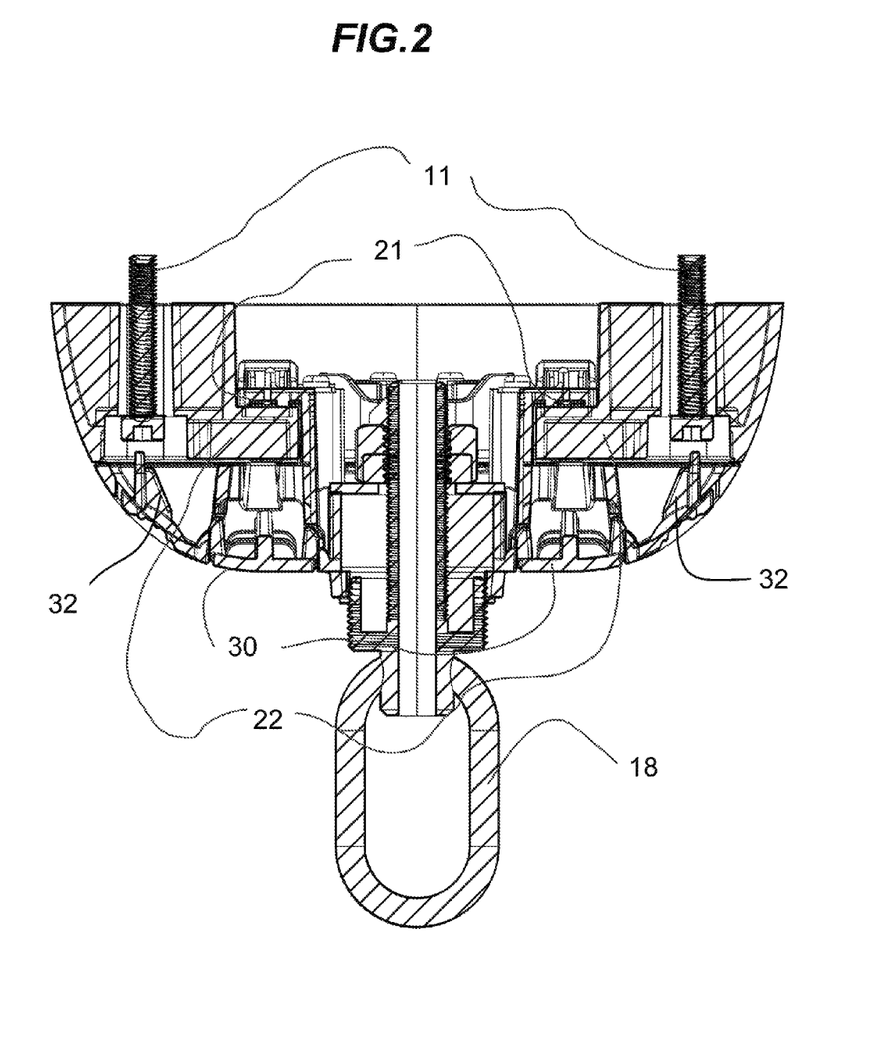
FIG. 2 Cutaway side view.
Figure 3:
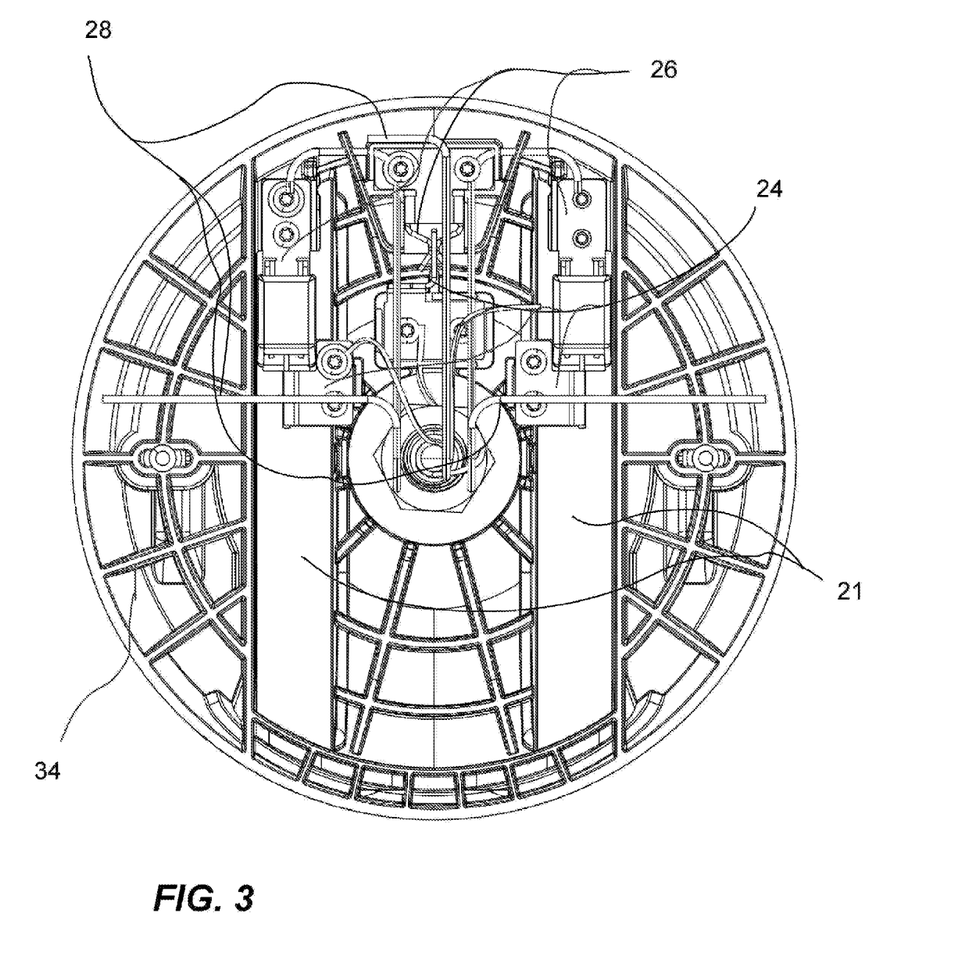
FIG. 3 Top view with line wires.
Figure 4:
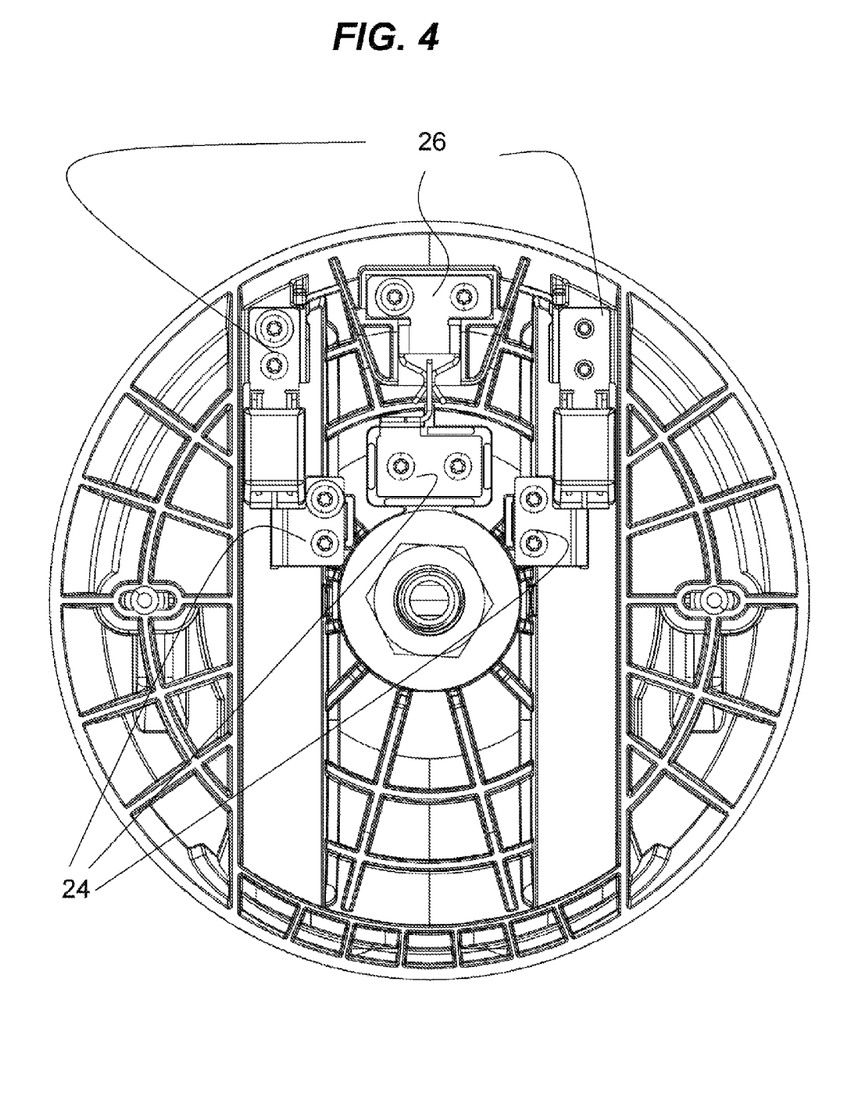
FIG. 4 Top view without line wires.
Figure 5:
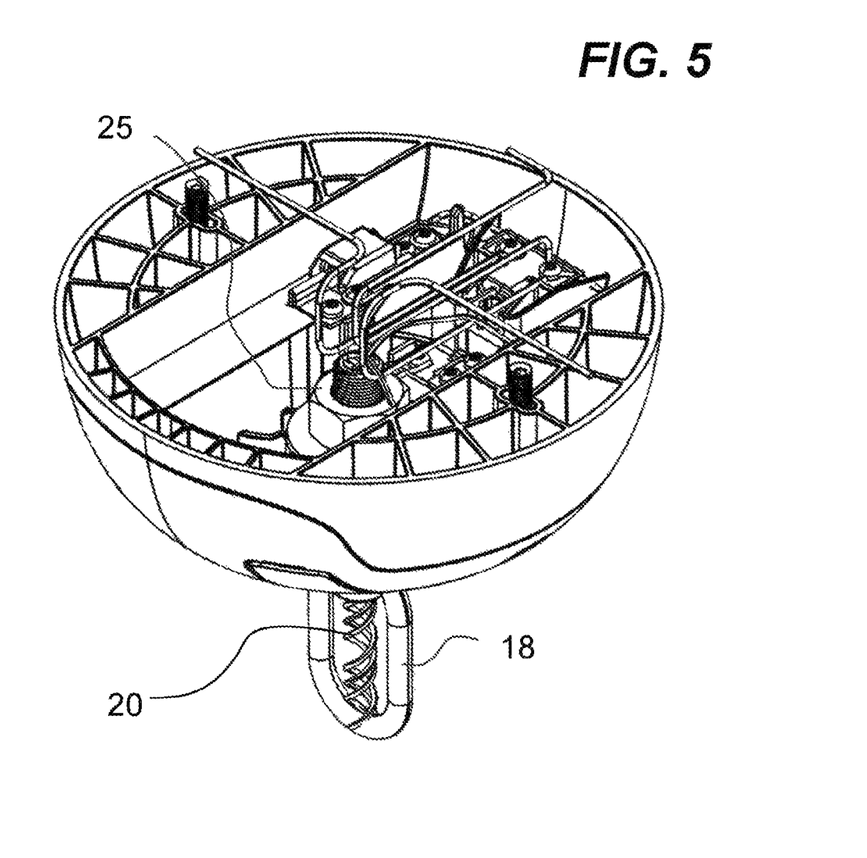
FIG. 5 Isometric view favoring the top.
Figure 6:
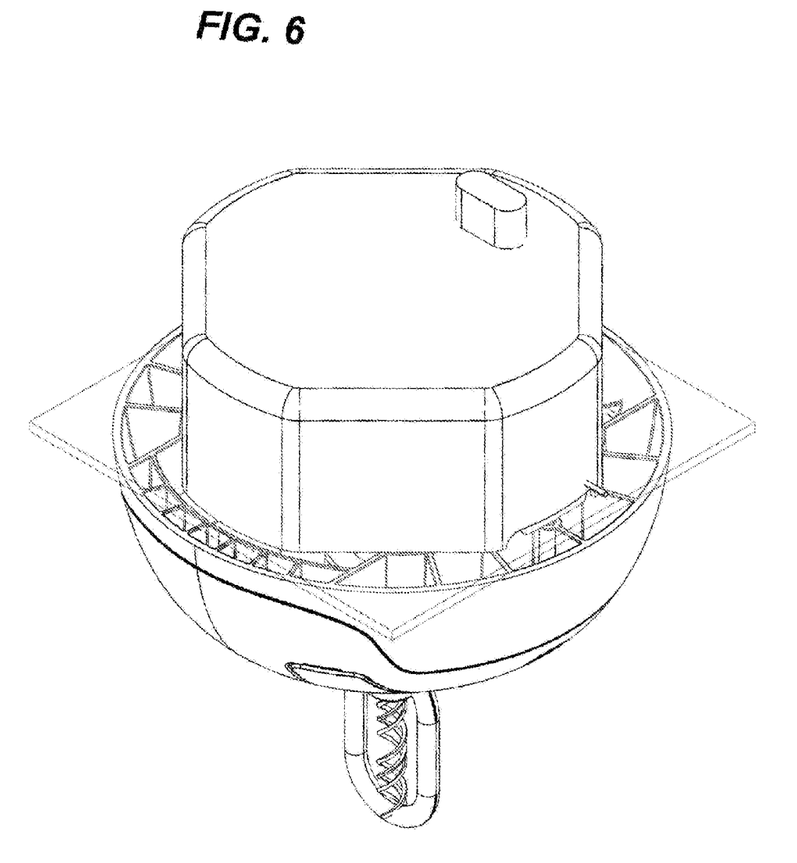
FIG. 6 Isometric view favoring the top connected to electric box.
Figure 7:
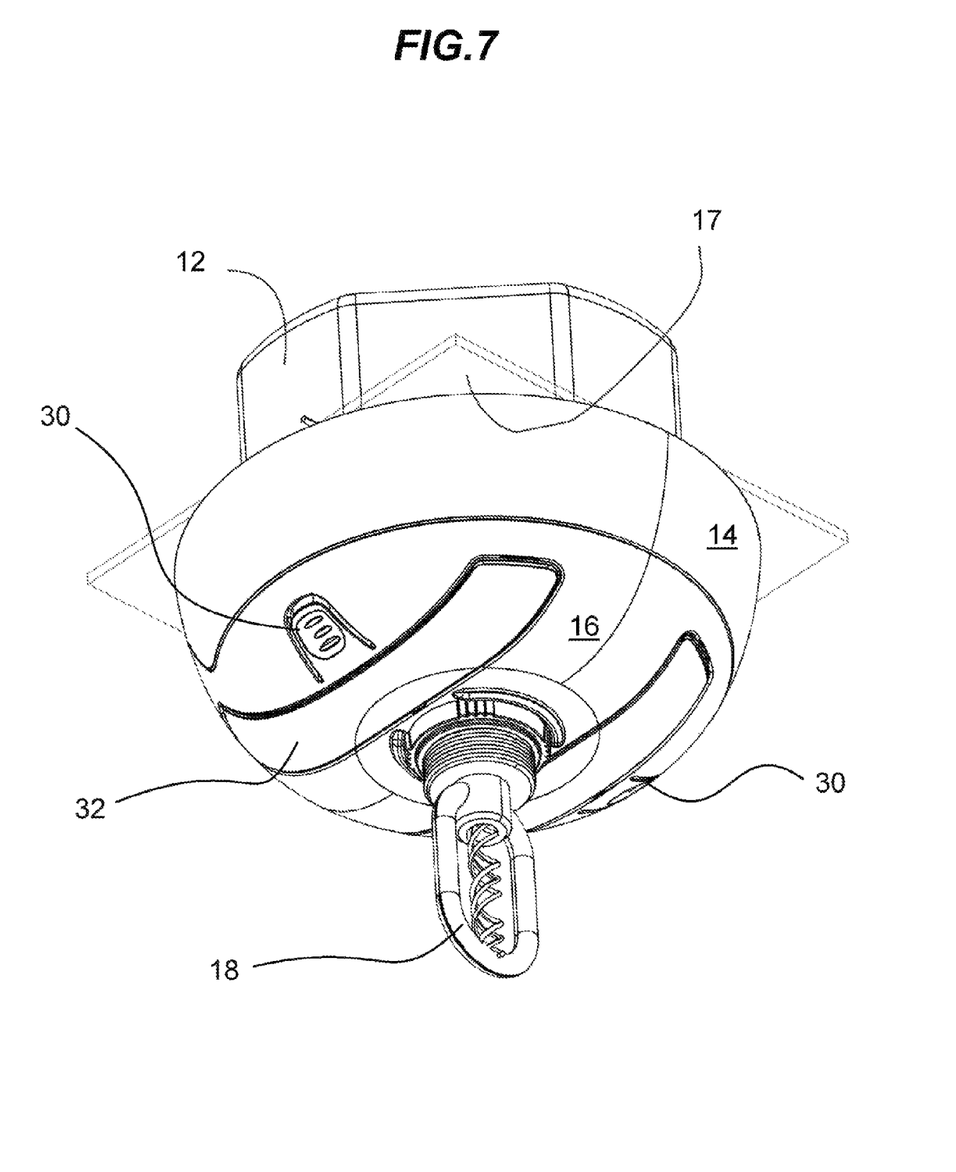
FIG. 7 isometric view favoring the bottom.
Figure 8A:
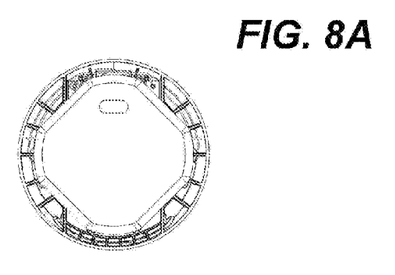
FIGS. 8A-F Views of all 6 faces.
Figures 8B, 8C:
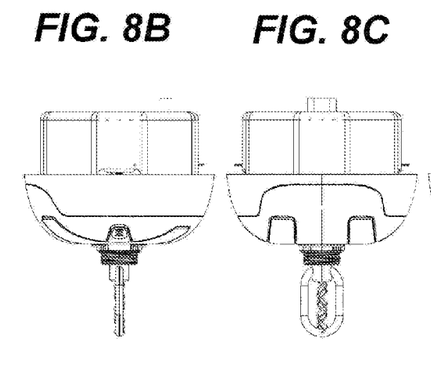
Figure 8D:
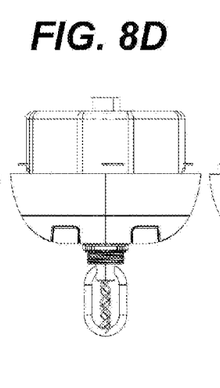
Figure 8E:
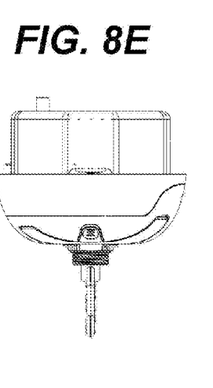
Figure 8F:
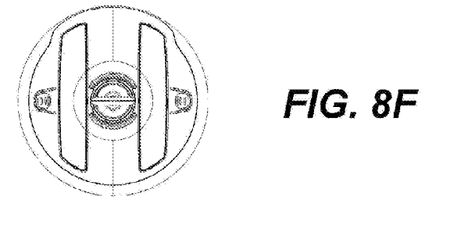

A connector (10) for mechanically and electrically connecting a luminaire (not shown) to a ceiling electric box (12) has a first connector member (14) and a second connector member (16). The first connector member (14) is mechanically connected to the ceiling electric box (12) using mechanical fasteners (11) passing through openings (13), and is electrically connected by way of line wires (28) in a manner that is similar to the way light fixtures are electrically and mechanically connected in the prior art, and need not be further described herein.

In a separate operation, a luminaire (not shown) is mechanically and electrically connected to the second connector member (16) by way of a loop member (18) which allows electrical wires (20) running up from the luminaire (not shown) to pass through a hollow bolt member (23) and electrically connect to the second connector member (16) by way of pins (24). A nut and washer combination (25) mechanically connect the loop member (18) to the second connector member (16).

When this is done, the second connector member (16) is mechanically connected to the first connector member (14) by sliding it into the first connector member (14) following path indicated by arrow (19). Channels (21), forming an integral part of the first connector member (14), slide into guide tracks (22), forming an integral part of the second connector member (16). This sliding motion is done parallel to a ceiling (17), in other words, generally in a horizontal fashion so that no lifting is required, which further facilitates the operation.

The sliding motion is done until the channels (21) electrically connect the pins (24) into the corresponding electrical connection clips (26). The three clips (26) are what line wires (28) are connected to in the first step described hereinabove. Securing covers (30), on each side of the guide tracks (22), clip and hold the second connector member (16) securely.

To remove the second connector member (16), one only needs to push-in both clips (30), and slide out the second connector member (16).

Push-in snap clips (32) snap into the securing covers (30) to lock it in place so that it can lock the second connector member (16) in place.

The electrical connection dips (26) are resiliently deformable so as to provide a secure electro-mechanical connection onto the pins (24). They use the same metal as commonly used in electrical equipment such as copper or aluminum. The first and second connector members (14, 16) are made of non-conductive material, generally plastic and use injection moulding to be fabricated. They feature reinforcement ribs (34) for structural integrity.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A connector for mechanically and electrically connecting or removing a luminaire to a ceiling electric box has a first connector member and a second connector member, said first connector member being mechanically connected to said ceiling electric box using mechanical fasteners passing through openings, and said first connector member being electrically connected by way of line wires; said second connector member is used, along with a loop member, for mechanically and electrically connecting said luminaire; said loop member having a hollow bolt member to allow for electric wires coming from said luminaire to pass through and electrically connect to a plurality of pins located inside said second connector member; said second connector member being mechanically connected to said first connector member by being slid into said first connector member following a path formed by channels, forming an integral part of said first connector member and cooperating with guide tracks, forming an integral part of said second connector member, sliding being done until said channels electrically connect said plurality of pins into a corresponding number of electrical connection clips; said plurality of clips electrically connect with said line wires; securing covers, located on each side of said guide tracks, clip and hold said second connector member securely onto said first connector member.

2. The connector for mechanically and electrically connecting a luminaire of claim 1 wherein push-in snap clips secure said securing covers in place.

3. The connector for mechanically and electrically connecting a luminaire of claim 1 wherein said electrical connection clips being resiliently deformable so as to provide a secure electro-mechanical connection onto said pins.

4. The connector for mechanically and electrically connecting a luminaire of claim 1 wherein said plurality of pins and said clips being formed of metal selected from the group consisting of copper, aluminum and steel.

5. The connector for mechanically and electrically connecting a luminaire of claim 1 wherein said first connector member and said second connector member body being made from non-conductive material.

6. The connector for mechanically and electrically connecting a luminaire of claim 1 wherein said first connector member and said second connector member body are made by injection moulding and having reinforcement ribs.

7. The connector for mechanically and electrically connecting a luminaire of claim 1 wherein a nut and washer combination mechanically connects the loop member to said second connector member.

8. The connector for mechanically and electrically connecting a luminaire of claim 1 wherein said sliding motion being done parallel to a ceiling.

* * * * *